US008649617B2

(12) United States Patent
Kikuchi et al.

(10) Patent No.: US 8,649,617 B2
(45) Date of Patent: Feb. 11, 2014

(54) IMAGE DECODING APPARATUS AND NON-TRANSITORY COMPUTER READABLE MEDIUM

(75) Inventors: Yusuke Kikuchi, Kanagawa (JP); Tomohiro Hasegawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 394 days.

(21) Appl. No.: 13/052,357

(22) Filed: Mar. 21, 2011

(65) Prior Publication Data
US 2012/0114258 A1 May 10, 2012

(30) Foreign Application Priority Data

Nov. 4, 2010 (JP) .................................. 2010-247673

(51) Int. Cl.
G06K 9/36 (2006.01)
G06K 9/46 (2006.01)
(52) U.S. Cl.
USPC .......................................................... 382/233
(58) Field of Classification Search
USPC ...................... 382/233; 375/240.25; 386/356
See application file for complete search history.

(56) References Cited

U.S. PATENT DOCUMENTS

| 6,462,744 | B1* | 10/2002 | Mochida et al. ............... 345/543 |
| 2004/0008770 | A1* | 1/2004 | Okada et al. ............. 375/240.02 |
| 2004/0179611 | A1* | 9/2004 | Sota et al. ................ 375/240.25 |
| 2006/0245504 | A1* | 11/2006 | Ogikubo et al. ......... 375/240.25 |
| 2009/0034625 | A1* | 2/2009 | Komi et al. .............. 375/240.25 |

FOREIGN PATENT DOCUMENTS

JP 10-084558 3/1998

* cited by examiner

Primary Examiner — Phuoc Tran
(74) Attorney, Agent, or Firm — Sprinkle IP Law Group

(57) ABSTRACT

An image decoding apparatus according to an embodiment includes a decoding section configured to encode an encoded stream and output decoded picture; and a control section configured to control decoding of the decoding section, and perform memory management of a memory section that has memory areas for data of four frames that stores the reference images of two frames, the decoded picture from the decoding section, and the decoded picture used for display, wherein the control section causes the decoding section to decode a number of pictures that is in accordance with a speed multiplying number in one frame period at a time of multiple speed reproduction, and exchanges data stored among the memory areas for data of four frames so that the decoded picture used for the display at a time of multiple speed reproduction is held in the memory area.

13 Claims, 12 Drawing Sheets

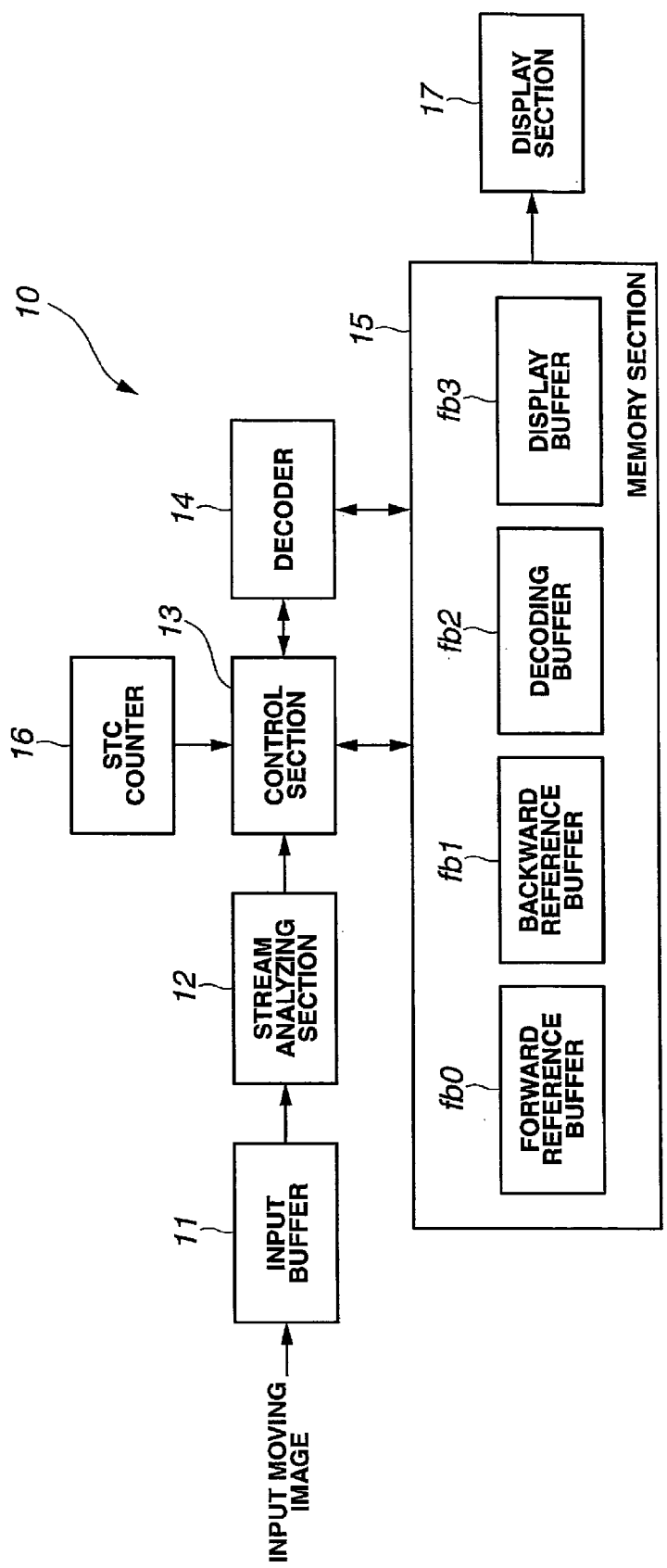

FIG.2A

| I2 | B0 | B1 | P5 | B3 | B4 | P8 | B6 | B7 | P11 | B9 | B10 |

FIG.2B

| I2 | B0 | B1 | P5 | B3 | B4 | P8 | B6 | B7 | P11 | B9 | B10 |

FIG.3A

| I0 | P1 | P2 | P3 | P4 | P5 | P6 | P7 | P8 | P9 | P10 | P11 |

FIG.3B

| I0 | P1 | P2 | P3 | P4 | P5 | P6 | P7 | P8 | P9 | P10 | P11 |

| TIME | NORMAL TIME | | DOUBLE SPEED TIME | |
|---|---|---|---|---|
| | STC | DTS | STC | DTS |
| V1 | 6000 | I0 | 6000 | I0 |
| V2 | 9000 | P1 | 12000 | P1 - P2 |
| V3 | 12000 | P2 | 18000 | P2 - P4 |
| V4 | 15000 | P3 | 24000 | P3 - I'6 |
| V5 | 18000 | P4 | 30000 | P4 - P'7 |
| V6 | 21000 | P5 | 36000 | P5 - P'10 |
| V7 | 24000 | I'6 | 42000 | |
| V8 | 27000 | P'7 | 48000 | |
| V9 | 30000 | P'8 | 54000 | |
| V10 | 33000 | P'9 | 60000 | |
| V11 | 36000 | P'10 | 66000 | |
| ⋮ | ⋮ | ⋮ | ⋮ | |

FIG.6

| index | picture_coding_type | DTS |
|---|---|---|
| 0 | I | 0 |
| 1 | B | 3000 |
| 2 | B | 6000 |
| 3 | P | 9000 |
| 4 | B | 12000 |
| 5 | B | 15000 |
| 6 | P | 18000 |
| 7 | | |
| 8 | | |
| ⋮ | ⋮ | ⋮ |
| 99 | | |

FIG.11

| PICTURE | DTS |
|---|---|
| I0 | 0 |
| P1 | 3000 |
| P2 | 6000 |
| P3 | 9000 |
| P4 | 12000 |
| P5 | 15000 |
| P6 | 18000 |
| P7 | 21000 |
| P8 | 24000 |

FIG.12

| dec | Fb0 | Fb1 | Fb2 | Fb3 | dsp | STEP |
|---|---|---|---|---|---|---|
|  |  |  |  |  |  | S46 |
|  |  |  |  |  |  | S48 |
|  |  |  |  |  |  | S51 |
| I0 |  | I0 |  |  |  | S52 |
|  | I0 |  |  |  |  | S46 |
|  |  | I0 |  |  |  | S48 |
|  |  | I0 |  |  |  | S51 |
| P1 | I0 | P1 |  |  |  | S52 |
|  | P1 | I0 |  |  |  | S61 |
|  | P1 |  |  | I0 |  | S64 |
| P2 | P1 | P2 |  | I0 |  | S66 |
|  | P2 | P1 |  | I0 |  | S46 |
|  | P2 |  | P1 | I0 |  | S49 |
| P3 | P2 | P3 | P1 | I0 | I0 | S52 |
|  | P3 | P2 | P1 | I0 |  | S61 |
|  | P3 | P1 | P2 | I0 |  | S65 |
| P4 | P3 | P4 | P2 | I0 | I0 | S66 |
|  | P4 | P3 | P2 | I0 |  | S46 |
|  | P4 | I0 | P2 | P3 |  | S48 |
|  | P4 | I0 | P3 | P2 |  | S51 |
| P5 | P4 | P5 | P3 | P2 | P2 | S52 |
|  | P5 | P4 | P3 | P2 |  | S61 |
|  | P5 | P3 | P4 | P2 |  | S65 |
| P6 | P5 | P6 | P4 | P2 | P2 | S66 |
|  | P6 | P5 | P4 | P2 |  | S46 |
|  | P6 | P2 | P4 | P5 |  | S48 |
|  | P6 | P2 | P5 | P4 |  | S51 |
| P7 | P6 | P7 | P5 | P4 | P4 | S52 |
|  | P7 | P6 | P5 | P4 |  | S61 |
|  | P7 | P5 | P6 | P4 |  | S65 |
| P8 | P7 | P8 | P6 | P4 | P4 | S66 |

FIG.13

| PICTURE | DTS |
|---------|-------|
| I2 | 0 |
| B0 | 3000 |
| B1 | 6000 |
| P5 | 9000 |
| B3 | 12000 |
| B4 | 15000 |
| P6 | 18000 |
| P7 | 21000 |
| P8 | 24000 |
| P9 | 27000 |
| P10 | 30000 |

FIG.14

| | dec | Fb0 | Fb1 | Fb2 | Fb3 | dsp | STEP |
|---|---|---|---|---|---|---|---|
| 0 — | | | | | | | S46 |
| | | | | | | | S48 |
| | | | | | | | S51 |
| | | I2 | | I2 | | | S52 |
| 6000 — | | | | I2 | | | S43 |
| | | B1 | | I2 | B1 | | S44 |
| 12000 — | | | I2 | | B1 | | S46 |
| | | | I2 | | B1 | | S48 |
| | | | I2 | | | B1 | S51 |
| | | P5 | I2 | P5 | | B1 | B1 | S52 |
| 18000 — | | | P5 | I2 | | B1 | | S46 |
| | | | P5 | B1 | | I2 | | S48 |
| | | P6 | P5 | P6 | | I2 | I2 | S52 |
| 24000 — | | | P6 | P5 | | I2 | | S46 |
| | | | P6 | I2 | | P5 | | S48 |
| | | P7 | P6 | P7 | | P5 | P5 | S52 |
| | | | P7 | P6 | | P5 | | S61 |
| | | | P7 | | P6 | P5 | | S65 |
| | | P8 | P7 | P8 | P6 | P5 | P5 | S66 |
| 30000 — | | | P8 | P7 | P6 | P5 | | S46 |
| | | | P8 | P5 | P6 | P7 | | S48 |
| | | | P8 | P5 | P7 | P6 | | S51 |
| | | P9 | P8 | P9 | P7 | P6 | P6 | S52 |
| | | | P9 | P8 | P7 | P6 | | S61 |
| | | | P9 | P7 | P8 | P6 | | S65 |
| | | P10 | P9 | P10 | P8 | P6 | P6 | S66 |

STC ↓

IMAGE DECODING APPARATUS AND NON-TRANSITORY COMPUTER READABLE MEDIUM

CROSS-REFERENCE TO RELATED APPLICATION

This application is based upon and claims the benefit of priority from the prior Japanese Patent Application No. 2010-247673, filed on Nov. 4, 2010; the entire contents of which are incorporated herein by reference.

FIELD

Embodiments described herein relate generally to an image decoding apparatus and a non-transitory computer readable medium.

BACKGROUND

Conventionally, when storing or transmitting a digitized moving image signal, in many cases the signal is encoded using an encoding method such as MPEG (Moving Picture Experts Group)-2, MPEG-4, H.264 or VC-1.

Multiple speed reproduction of an encoded stream is sometimes performed by an image decoding apparatus. An image decoding apparatus can perform multiple speed reproduction of an encoded stream by thinning out (skipping) pictures to be decoded from the encoded stream. For example, double speed reproduction can be performed by decoding only one of every two pictures and outputting the decoded pictures for display.

However, in order to decode P and B pictures, it is necessary to decode I and P pictures that are reference images for the P and B pictures. Therefore, although skipping can be appropriately performed in accordance with a speed multiplying number with respect to a B picture, it is necessary to consider the reference relationship when skipping with respect to I and P pictures.

According to motion-compensated predictive coding, for images in which there is a large amount of motion, the coding amount is sometimes reduced more by executing unidirectional predictive coding than by executing bidirectional predictive coding. In such cases, P pictures sometimes occur in succession in an encoded stream without any B pictures. If a P picture is skipped, a P picture that is present thereafter can not be decoded. Hence, when performing multiple speed reproduction, P pictures are decoded successively and P pictures are skipped successively in accordance with the speed multiplying number. Accordingly, when performing multiple speed reproduction of a stream in which P pictures are present in succession, in some cases the images have a jerky motion.

BRIEF DESCRIPTION OF THE DRAWINGS

FIG. 1 is a block diagram that illustrates an image decoding apparatus according to one embodiment of the present invention;

FIG. 2A and FIG. 2B are explanatory views for explaining double speed reproduction according to the prior art;

FIG. 3A and FIG. 3B are explanatory views for explaining double speed reproduction according to the prior art;

FIG. 6 is a chart that shows a picture table obtained by analyzing encoded frames;

FIG. 11 is a chart that illustrates a relationship between a picture type and a DTS of encoded frames;

FIG. 12 is an explanatory view that illustrates changes in the contents of respective buffers fb0 to fb3 of a memory section 15 in accordance with the passage of time;

FIG. 13 is a chart that illustrates a relationship between a picture type and a DTS of encoded frames; and FIG. 14 is an explanatory view that illustrates changes in the contents of respective buffers fb0 to fb3 of a memory section 15 in accordance with the passage of time.

DETAILED DESCRIPTION

Figures 4, 5:
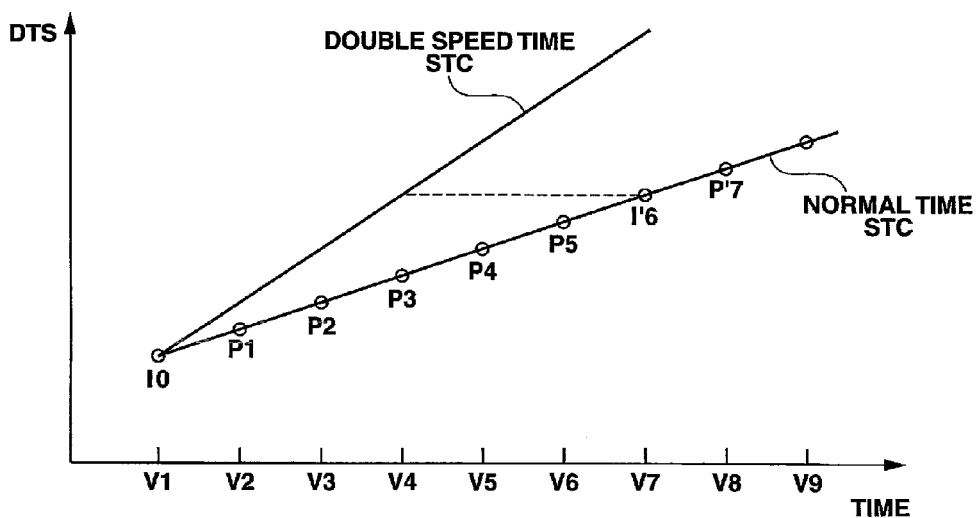
FIG. 4 is an explanatory view for explaining decoding timing, in which the abscissa axis represents time and the ordinate axis represents a DTS.
FIG. 5 is a chart that corresponds to FIG. 4.

An embodiment of the present invention is described in detail hereunder with reference to the drawings.

According to one embodiment, an image decoding apparatus includes: a decoding section configured to decode pictures of the encoded stream and output decoded pictures; and a control section configured to control the decoding section, and to perform memory management of a memory that has memory areas for storing four pictures including two reference pictures, the decoded picture from the decoding section, and the decoded picture for display, wherein the control section controls the decoding section to decode at least first and second pictures in one frame period at a time of multiple speed reproduction, and reallocates pictures stored in the memory areas.

FIG. 1 is a block diagram that illustrates an image decoding apparatus according to an embodiment of the present invention.

In FIG. 1, an encoded stream of an input moving image is input into an input buffer 11 of an image decoding apparatus 10. The encoded stream is supplied from the input buffer 11 to a stream analyzing section 12. The stream analyzing section 12 analyzes a picture type and a decoding time stamp (DTS) of each picture in the encoded stream that is sequentially input, and outputs each picture and an analysis result to a control section 13.

The control section 13 also receives input of a system time clock (STC) that is time information for inside the system from an STC counter 16. The control section 13 controls each section based on a reproduction mode. More specifically, the control section 13 supplies each picture to a decoder 14 in accordance with the reproduction mode, and instructs the decoder 14 to decode each picture at a timing that is based on the STC. The decoder 14 is controlled by the control section 13 to decode an input picture and supply the decoding result to a memory section 15 for storage. The memory section 15 has a memory for data of one frame with respect to each of a forward reference buffer fb0, a backward reference buffer fb1, a decoding buffer fb2, and a display buffer fb3.

According to the present embodiment, the control section 13 can control each section in not only a normal reproduction mode, but also in a multiple speed reproduction mode. The control section 13 is configured to be able to control the decoder 14 during multiple speed reproduction to cause the decoder 14 to select and decode pictures in accordance with a multiple-speed reproduction number, and to decode a number of pictures that is in accordance with the multiple-speed reproduction number in one frame period. Further, the control section 13 is configured to control the memory section 15 so as to exchange decoded picture that is stored in respective buffers fb0 to fb3 among the buffers fb0 to fb3 and store the decoded picture.

Next, a decoding method that is employed at a time of multiple speed reproduction according to the present embodiment is described referring to FIG. 2A to FIG. 10. Note that the decoding method illustrated in FIG. 6 to FIG. 10 can be implemented by a program that causes a computer to operate according to the method illustrated in FIG. 6 to FIG. 10.

FIG. 2A, FIG. 2B, FIG. 3A and FIG. 3B are explanatory views for explaining double speed reproduction according to the prior art.

FIG. 2A illustrates an encoded stream obtained by encoding a predetermined input moving image. In the encoded stream shown in FIG. 2A, reference characters I, P, and B denote an I picture, a P picture, and a B picture, respectively, while numerical suffixes to the reference characters I, P, and B denote frame numbers that correspond to a moving image sequence of the input moving image. Reference images are required in order to decode P and B pictures, and the order of pictures in the encoded stream is different from the moving image sequence. For example, to decode pictures B3 and B4, it is necessary to use decoded images of pictures I2 and P5 as reference images, and the pictures B3 and B4 are transmitted after the pictures I2 and P5.

In FIG. 2B, images that are skipped at a time of double speed reproduction are denoted by a broken line portion. Ideally, in double speed reproduction it is sufficient to reproduce frames of, for example, frame numbers 0, 2, 4, . . . . However, it is necessary to reproduce the P5 picture in order to reproduce the B4 picture. Therefore, the P5 picture is decoded and reproduced in place of the B4 picture and output. More specifically, according to the example shown in FIG. 2B, the frames of frame numbers 0, 2, 5, 6, 8, 11, . . . are sequentially reproduced and output. In the example shown in FIG. 2A and FIG. 2B, although the skipping intervals are non-uniform to some extent, there is not a great degree of unnaturalness in the reproduced image.

In contrast, FIG. 3A illustrates an example of an encoded stream obtained by encoding an input moving image in which there is a relatively large amount of motion. According to this example, B pictures are not employed, and P pictures occur in succession. In FIG. 3B, skipped images in a case where double speed reproduction is performed by a conventional image decoding apparatus into which the encoded stream shown in FIG. 3A is inputted are shown with a broken line. As described above, although ideally it is sufficient to reproduce, for example, the frames of frame numbers 0, 2, 4, . . . , in order to decode a P picture it is necessary to decode an I and a P picture that serve as reference images thereof. If a P picture is skipped, a subsequent P picture can not be decoded. Therefore, in the example shown in FIG. 3B it is necessary to decode, reproduce and output consecutive P pictures that follow an I picture. More specifically, according to the example shown in FIG. 3B, the frames of frame numbers 0, 1, 2, 3, 4, 5, 12 . . . are sequentially reproduced and output. According to the example shown in FIG. 3A and FIG. 3B, there is a large skipping interval, and thus the reproduced image is jerky.

Therefore, it is conceivable to enable multiple speed reproduction in which skipping intervals are made approximately uniform by decoding two pictures in order to generate an image for display and a reference image in one frame period.

FIG. 4 is an explanatory view for explaining decoding timing in which the abscissa axis represents time and the ordinate axis represents a DTS. Note that FIG. 4 illustrates a different example to that shown in FIG. 3A and FIG. 3B. FIG. 5 is a chart that corresponds to FIG. 4, which shows the relationship between a DTS (decoding time stamp), a STC (system clock), and a reproduction time that corresponds to each picture of the encoded stream.

In the image decoding apparatus, at intervals of a fixed period, the internal time information (STC) of the system is referred to, and decoding is performed when the STC value reaches a decoding time stamp (DTS) that is set for the frame that is the decoding object.

FIG. 4 and FIG. 5 illustrate an example in which the STC is composed by a 90 KHz counter, and the frame rate is 30 frames/second, so that the STC increases by (90000/30)= 3000 per frame. During normal reproduction, each time that the STC increases by 3000 indicates that a decoding timing of a picture is reached. More specifically, during normal reproduction, the respective pictures are sequentially decoded, reproduced and output at the timing of times V1, V2, V3 . . . .

In contrast, during double speed reproduction, the STC is incremented by 6000 at each of the times V1, V2, V3 . . . . As shown in FIG. 4 and FIG. 5, at each of these times, the image decoding apparatus can reproduce pictures of a plurality of frames. For example, at the time point of the time V4, since pictures from P3 to I'6 are supplied to the input buffer, the image decoding apparatus can decode any one of these pictures.

If it is assumed that the image decoding apparatus decodes, reproduces and outputs only one picture at each time, according to the example shown in FIG. 4 and FIG. 5, during double speed reproduction the pictures I0, P1, P3, I'6, p7, . . . are decoded, reproduced and output. Similarly to the example shown in FIG. 3B, in this case a reproduction image in which the motion is jerky is obtained.

In this connection, a sufficient memory band width to enable decoding of P and B pictures is set in the image decoding apparatus. Although a memory access has a significant effect on a load at a time of decoding, a load when decoding a P picture is sufficiently small in comparison to when decoding of a B picture. Therefore, an image decoding apparatus is normally capable of decoding two P pictures in one frame period (hereunder, also referred to as "multi-frame decoding"). Therefore, with respect to P pictures, it is conceivable to decode two pictures, one for use as a reference image and one for reproduction, at each time.

For example, in the example shown in FIG. 4 and FIG. 5, the image decoding apparatus decodes the pictures P1 and P2 at a time V2. Decoding of the P1 picture is performed to obtain a reference image for use when decoding the P2 picture. It is considered that multiple speed reproduction in which skipping intervals are made approximately equal is thereby enabled.

However, in this case, since two pictures are decoded in one frame period, there is a disadvantage that the memory capacity required in order to hold the decoded picture increases. According to the present embodiment, a memory writing method for preventing an increase in the memory capacity is adopted.

Figure 7:
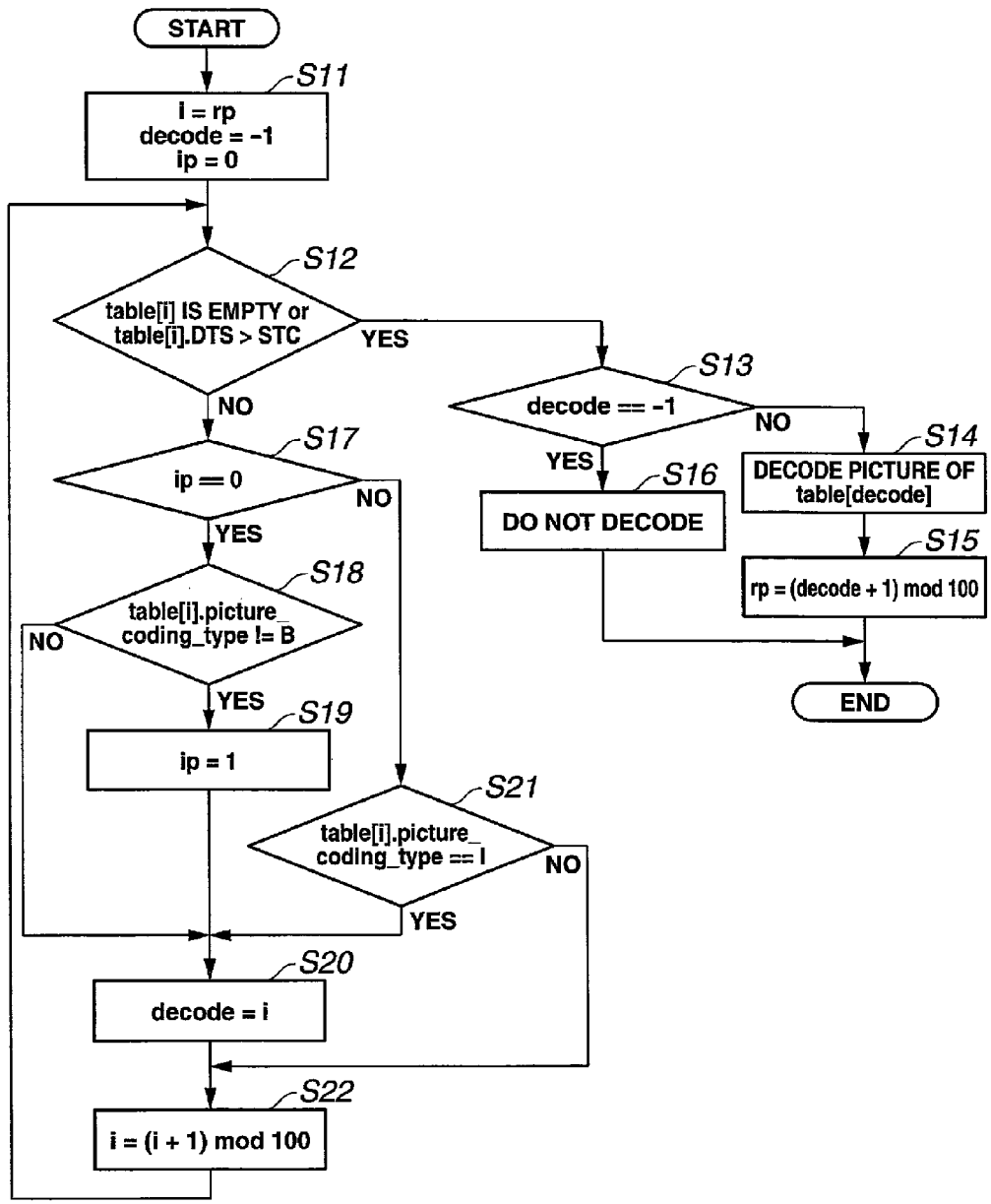
FIG. 7 is a flowchart that shows a flow of operations for determining a picture to be decoded at a control section 13.
Figure 8:
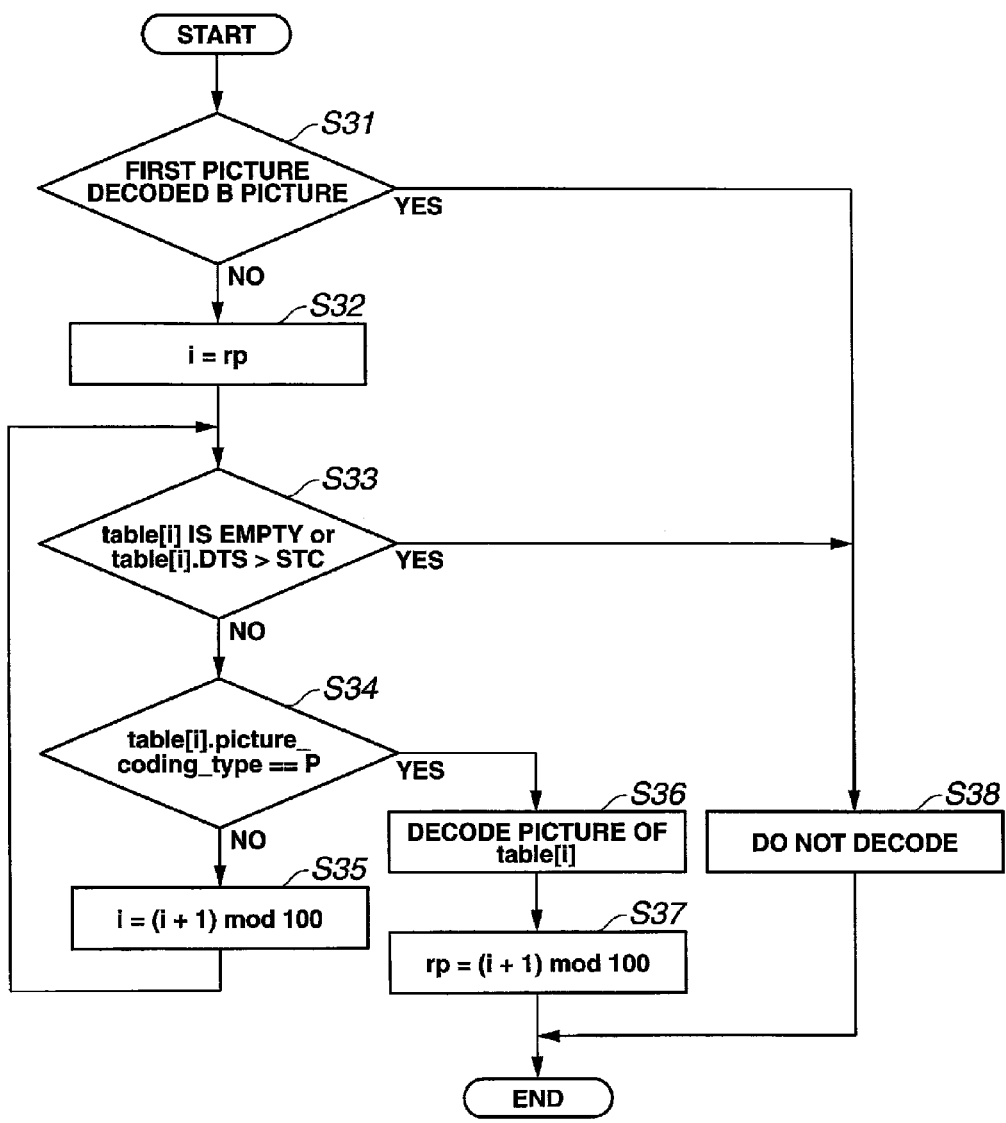
FIG. 8 is a flowchart that shows a flow of operations for determining a picture to be decoded at a control section 13.

FIG. 6 to FIG. 8 are views for describing a method that selects a picture to be decoded according to the present embodiment. FIG. 6 is an explanatory view that shows a picture table obtained by analyzing encoded frames. The picture table is obtained by analyzing header information of each picture.

The stream analyzing section 12 analyzes header information in a stream that has been input to the input buffer 11 before decoding, and generates the picture table shown in FIG. 6 in the input order. The stream analyzing section 12 attaches an index to each picture, and extracts information regarding the picture type (picture_coding_type) and DTS of each picture. In this connection, although each picture includes a variety of header information, an illustration thereof is omitted from FIG. 6 (broken line).

A picture that is decoded or skipped is deleted from the picture table. The stream analyzing section 12 manages the picture table as a ring buffer, and writing is performed by returning to the first entry after the final entry. In this connection, although FIG. 6 illustrates an example in which information is managed in frame units, information may also be managed in field units.

FIG. 7 and FIG. 8 are flowcharts that illustrate a flow of operations the control section 13 performs to determine a picture to be decoded. The flow of operations shown in FIG. 7 and FIG. 8 are used in a common manner during both normal reproduction and multiple speed reproduction.

As described above, according to the present embodiment, during multiple speed reproduction, a number of pictures that is in accordance with the multiple-speed reproduction number are decoded in one frame period. FIG. 7 illustrates a flow of operations for selecting pictures to be decoded first during normal reproduction and during multiple speed reproduction. As shown in FIG. 4 and FIG. 5, during multiple speed reproduction, a plurality of pictures can be decoded in one frame period. FIG. 8 illustrates a flow of operations for selecting pictures to be decoded as second and subsequent pictures during multiple speed reproduction.

In step S11 in FIG. 7, the control section 13 assigns a value "rp" of a starting index of unprocessed pictures as the value of a variable "i" for an index. A variable "decode" shows the index of a decoding candidate picture, and the control section 13 assigns −1 as the value of the variable "decode". Further, the control section 13 assigns 0 as the value of a variable "ip" that becomes 1 when a decoding candidate is an I picture or a P picture.

In step S12, the control section 13 determines whether or not the picture table of index i is empty or the DTS of the picture table of index i is greater than the STC. If the picture table of index i is not empty and the STC is equal to or greater than the DTS of the picture table of index i, the control section 13 moves the processing to step S17 to determine whether or not "ip" is 0. When "ip" is 0, in step S18, the control section 13 determines whether or not the picture type of index i is a B picture. If the picture type of index i is not a B picture, in step S19, the control section 13 assigns 1 as the value of the variable "ip", assigns "i" as the value of the variable "decode" (step S20), and increments "i" by one, taking 99 as the upper limit value thereof (step S22).

Note that, in step S18, if the control section 13 determines that the picture type is a B picture, the processing advances to step S20 without assigning 1 as the value of "ip". Further, if "ip" is not 0 in step S17, in step S21 the control section 13 determines whether or not the picture type is an I picture. If the picture type is an I picture, the processing moves to step S20, while if the picture type is not an I picture, the processing moves to step S22.

In step S12, the control section 13 determines whether or not the picture table of index i is empty or the DTS of the picture table of index i is greater than the STC. If this condition is satisfied, when the variable "decode" is −1 (step S13), the control section 13 determines that decoding is not possible and ends the processing without performing the decoding in step S16.

If the variable "decode" is not −1, in step S20, the control section 13 decodes a picture of the table of index i based on the value i that is assigned to the variable "decode" (step S14). In step S15, the control section 13 increments the starting index "rp" of unprocessed pictures by one, taking 99 as an upper limit value thereof, and ends the processing.

More specifically, the processing shown in FIG. 7 means that pictures for which DTS≤STC are decoded in the order of priority I>P>B. Further, with respect to I and B pictures, the pictures are decoded in a manner in which priority is given to the picture that is input last. Furthermore, P pictures are decoded in a manner in which priority is given to the picture that is input first.

During multiple speed reproduction, the control section 13 instructs the decoder 14 to decode pictures of a number that is in accordance with the speed multiplying number in one frame period. Pictures to be decoded as second and subsequent pictures are selected according to the flow of processing shown in FIG. 8. In step S31, the control section 13 determines whether or not the first picture decoded is a B picture. If the first picture decoded is a B picture, in step S38, the control section 13 ends the processing without performing decoding. In this connection, if the first picture decoded is a B picture, since a P picture that can be decoded does not exist at that point in time, the determination processing in step S31 may be omitted.

If an I or P picture is decoded as the first picture, next, in step S32, the control section 13 assigns "rp" as the value of the variable "i". Subsequently, in step S33, the control section 13 determines whether or not the picture table of index i is empty or the DTS of the picture table of index i is greater than the STC. If this condition is satisfied, since a decodable picture does not exist, the control section 13 ends the processing without performing the decoding in step S38.

If the control section 13 determines, next, in step S33 that the picture table of index i is not empty and the STC is equal to or greater than the DTS of the picture table of index i, in step S34, the control section 13 determines whether or not the picture of index i is a P picture.

If the control section 13 determines that the picture of index i is not a P picture in step S34, in step S35 the control section 13 increments i, taking 99 as an upper limit value thereof, and the processing returns to step S33.

If the control section 13 determines that the picture of index i is a P picture in step S34, the control section 13 moves the processing to step S36. In step S36, the control section 13 decodes the picture of index i, increments variable "rp" by one, taking 99 as an upper limit value thereof (step S37), and ends the processing.

More specifically, the processing illustrated in FIG. 8 means that the next P picture that follows the picture decoded immediately prior thereto is decoded.

According to the processing flow in FIG. 8, when decoding a plurality of pictures in one frame period, if memory management is performed in the same manner as in the conventional method, it is necessary to prepare extra memory to store the decoded picture. Therefore, according to the present embodiment, by performing memory management according to the flowcharts shown in FIG. 9 and FIG. 10, it is possible to perform multiple speed reproduction by performing multi-frame decoding without increasing the memory capacity.

Figure 9:
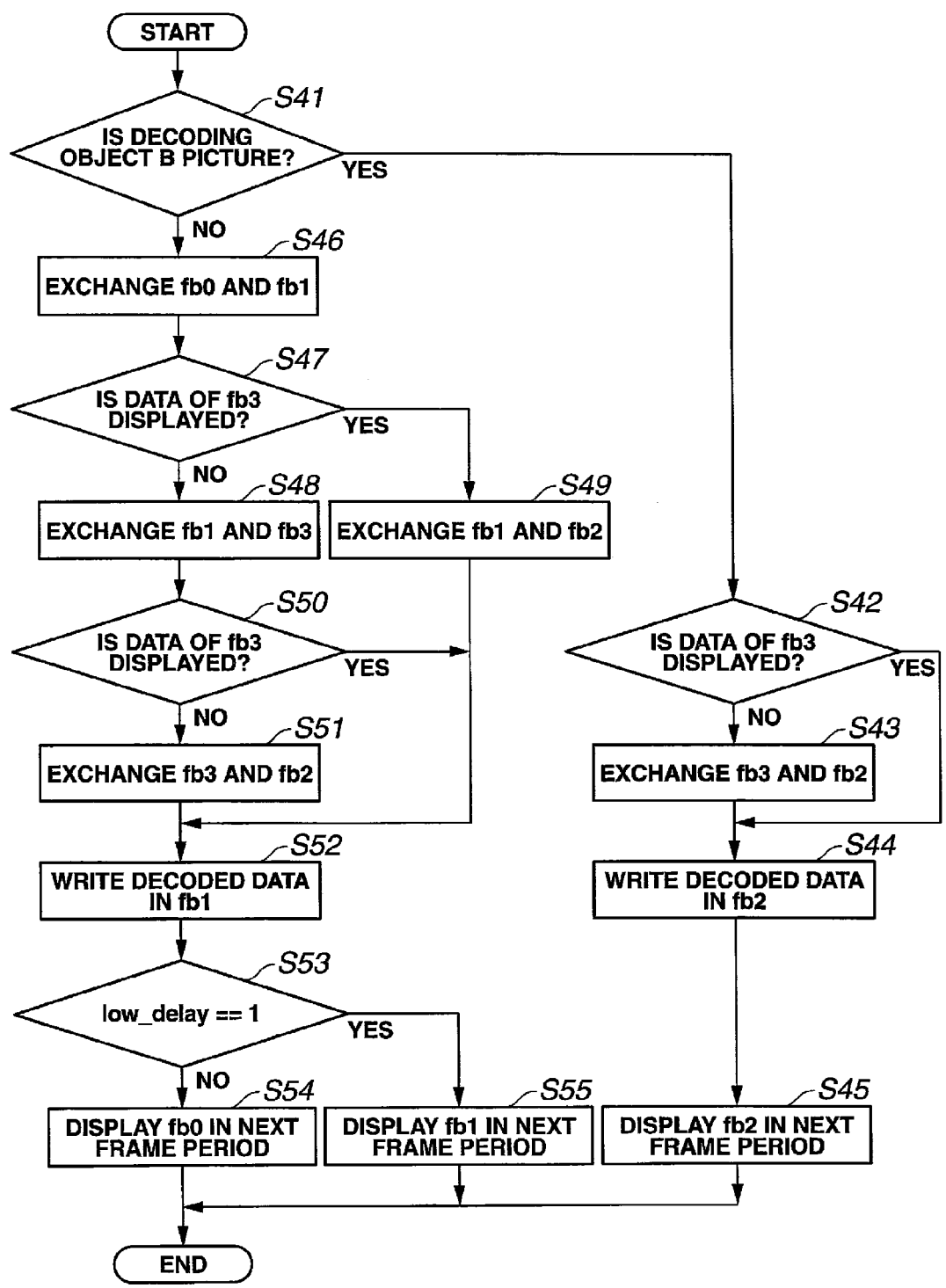
FIG. 9 is a flowchart for describing memory management when decoding a first picture during normal reproduction and during multiple speed reproduction.

FIG. 9 is a flowchart for describing memory management when decoding a first picture during normal reproduction and during multiple speed reproduction.

As shown in FIG. 1, buffers fb0 to fb3 for data of four frames are required as the memory section 15. Note that the buffers fb0 to fb3 for data of four frames are also required during normal reproduction, and the present embodiment enables multiple speed reproduction without increasing the capacity of the memory section 15.

When a picture decoded by the decoder 14 is an I or a P picture, the decoded picture is supplied to and stored in the forward reference buffer fb0 or the backward reference buffer fb1 as a reference image.

When a picture decoded by the decoder 14 is a B picture, the decoded picture is supplied to and stored in the decoding buffer fb2. Further, because the order in which frames are decoded is different to the display order, the display buffer fb3 is necessary in order to hold the decoded picture until the display timing.

In step S41, the control section 13 determines whether or not the picture that is a decoding object is a B picture. If the decoding object is a B picture, the control section 13 determines whether or not decoded picture to be displayed in the current frame period is stored in the display buffer fb3 (step S42). If the data in the display buffer fb3 is to be displayed in the current frame period, in step S43, the control section 13 exchanges the contents of the display buffer fb3 with the contents of the decoding buffer fb2. Thereafter, the control section 13 writes the decoded picture in the decoding buffer fb2 (step S44). If the data that is stored in the display buffer fb3 is not to be displayed in the current frame, the control section 13 writes the decoded picture in the decoding buffer fb2 without exchanging the contents of the buffers in step S43 (step S44). Subsequently, in step S45, the control section 13 displays the decoded picture of the decoding buffer fb2 in the next frame period.

If the picture that is a decoding object is an I or a P picture, the control section 13 moves the processing from step S41 to step S46. As described later, in the case of an I or P picture, the decoded picture thereof is, for example, written in the backward reference buffer fb1 (step S52). Therefore, in step S46, the control section 13 exchanges the contents of the forward reference buffer fb0 with the backward reference buffer fb1 so that, at the time of decoding, decoded picture that is written in the backward reference buffer fb1 is transferred to the forward reference buffer fb0 as a reference image.

Next, in step S47, the control section 13 determines whether or not the data in the display buffer fb3 is to be displayed in the current frame period. If the data of the display buffer fb3 is to be displayed in the current frame period, in step S49, the control section 13 exchanges the contents of the backward reference buffer fb1 with the contents of the decoding buffer fb2. Thereafter, the control section 13 writes the decoded picture in the backward reference buffer fb1 (step S52).

If the data stored in the display buffer fb3 is not to be displayed in the current frame, next, in step S48, the control section 13 exchanges the contents of the backward reference buffer fb1 with the contents of the display buffer fb3, and thereafter determines whether or not the data stored in the display buffer fb3 is to be displayed in the current frame.

If the data of the display buffer fb3 is not to be displayed in the current frame period, in step S51, the control section 13 exchanges the contents of the display buffer fb3 with the contents of the decoding buffer fb2, and thereafter writes the decoded picture in the backward reference buffer fb1 (step S52). If the data that is stored in the display buffer fb3 is to be displayed in the current frame, in step S51, the control section 13 writes the decoded picture in the backward reference buffer fb1 without exchanging the buffer contents.

Next, in step S53, the control section 13 determines whether or not the value of a variable "low_delay" is 1. If the value of the variable "low_delay" is 1, the control section 13 displays the contents of the backward reference buffer fb1 in the next frame period. If the value of the variable "low_delay" is not 1, the control section 13 displays the contents of the forward reference buffer fb0 in the next frame period.

Figure 10:
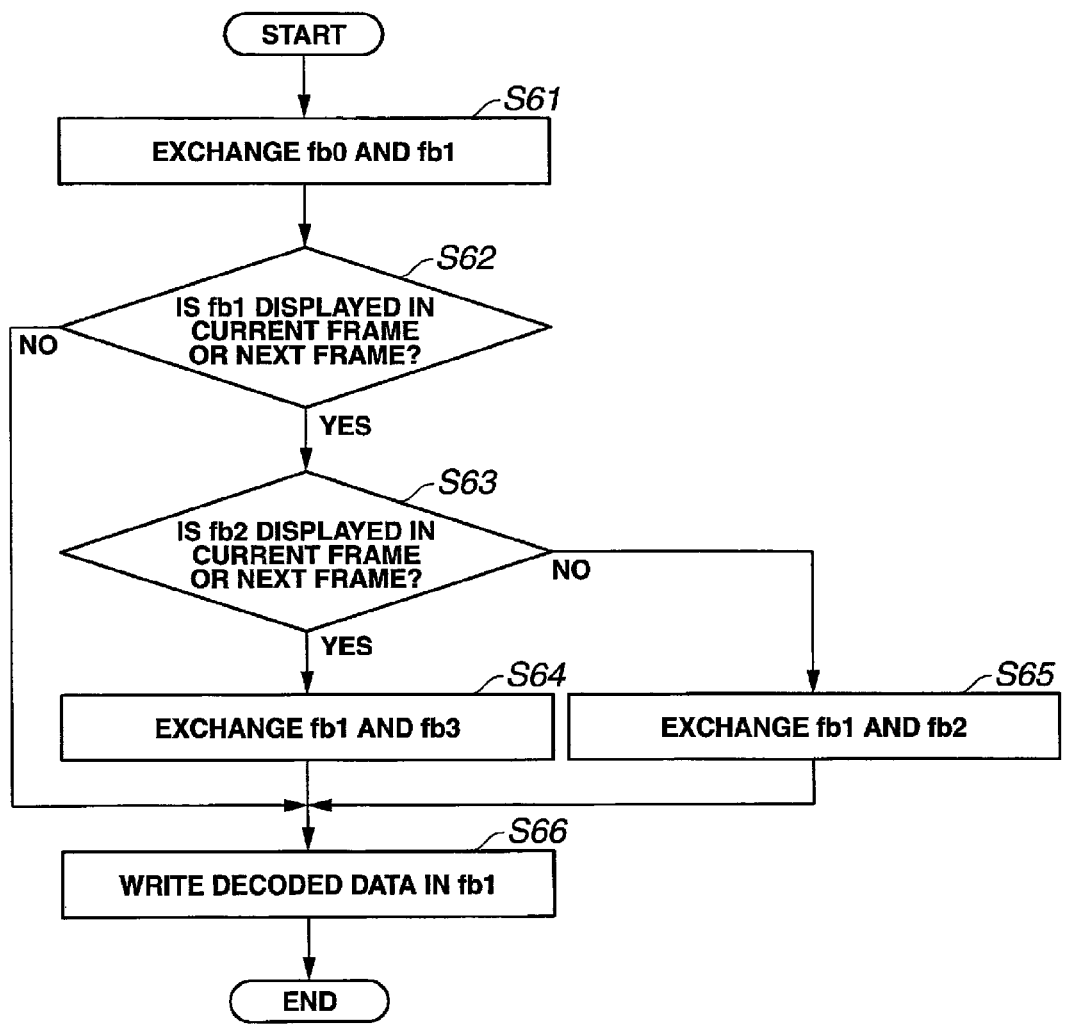
FIG. 10 is a flowchart for describing memory management when decoding a second picture during multiple speed reproduction.

FIG. 10 is a flowchart for describing memory management when decoding a second picture during multiple speed reproduction.

In step S61, the control section 13 exchanges the contents of the forward reference buffer fb0 with the contents of the backward reference buffer fb1. Next, in step S62, the control section 13 determines whether or not data of the backward reference buffer fb1 is to be displayed in the current frame or the next frame period. If the data of the backward reference buffer fb1 is not to the displayed in the current frame of the next frame period, in step S66 the control section 13 writes the decoded picture in the backward reference buffer fb1.

If the control section 13 determines in step S62 that the data of the backward reference buffer fb1 is to be displayed in the current frame or the next frame period, in the subsequent step S63, the control section 13 determines whether or not the data of the decoding buffer fb2 is to be displayed in the current frame or the next frame period.

If the data of the decoding buffer fb2 is to be displayed in the current frame or the next frame period, next, in step S64, the control section 13 exchanges the contents of the backward reference buffer fb1 with the contents of the display buffer fb3. Thereafter, the control section 13 writes the decoded picture in the backward reference buffer fb1 (step S66).

If the data stored in the decoding buffer fb2 is not to be displayed in the current frame or the next frame period, next, in step S65, the control section 13 exchanges the contents of the backward reference buffer fb1 with the contents of the decoding buffer fb2. Thereafter, the control section 13 writes the decoded picture in the backward reference buffer fb1 (step S66).

Next, the operations of the embodiment configured in this manner will be described referring to FIG. 11 to FIG. 14. FIG. 11 and FIG. 13 respectively show the relation between the picture type and the DTS of encoded frames. FIG. 12 and FIG. 14 are explanatory views that illustrate changes in the contents of the respective buffers fb0 to fb3 of the memory section 15 in accordance with the passage of time. In this connection, in FIG. 12 and FIG. 14, reference symbols S43, S44, S46, S48, S49, S51, S52, S61, S64, S65, and S66 denote the corresponding procedures that are executed according to the flowcharts in FIG. 9 and FIG. 10.

In FIG. 11 to FIG. 14, reference characters I, P, and B denote an I picture, a P picture, and a B picture, respectively, and numerical suffixes denote frame numbers. In FIG. 12 and FIG. 14, reference symbols Fb0 to Fb3 denote contents of the buffers fb0 to fb3, and the decoded picture of the relevant picture is indicated by the picture type and frame number. In FIG. 12 and FIG. 14, reference characters dec and dsp denote a picture that is decoded and a picture that is displayed, respectively. Further, FIG. 12 and FIG. 14 illustrate a case in which STC values (stc) are made to correspond to the flow of time on the vertical axis, and changes in the contents of each of the buffers fb0 to fb3 are shown for each row in accordance with the flow of time. In this connection, in FIG. 12 and FIG. 14, a thick line represents a separation of frame periods, and a broken thick line represents a separation between decoding of a first picture and a second picture.

FIG. 11 and FIG. 12 show example of encoded frames in which P pictures occur in succession. FIG. 11 illustrates the relationship between pictures I0, P1, P2 . . . P8 . . . and the DTS of each picture of the encoded frames.

FIG. 12 illustrates memory management with respect to the example shown in FIG. 11. When an I0 picture is input, the control section 13 causes the decoder 14 to decode the I0 picture. The decoded picture of the I0 picture is written in the buffer fb1 in step S52 in FIG. 9.

When the STC reaches 6000, as shown in FIG. 11, the P1 and P2 pictures can be decoded. In step S46, the control section 13 exchanges the contents of the buffers fb0 and fb1, and thereafter decodes the P1 picture. The control section 13 writes the P1 picture in the buffer fb1.

According to the present embodiment, decoding of the P2 picture is also performed in this frame period. Prior to this decoding, in step S61 the control section 13 exchanges the data of fb0 and fb1, and in step S64 the control section 13 exchanges the contents of fb1 and fb3. The decoded picture of the P2 picture is written in the buffer fb1 in step S66.

When the STC reaches 12000, the P3 and P4 pictures can be decoded. In step S46, the control section 13 exchanges the contents of the buffers fb0 and fb1, and thereafter, in step S49, exchanges the contents of the buffers fb1 and fb2. Next, the control section 13 decodes the P3 picture. The P3 picture is written in the buffer fb1 (step S52).

At this time point, the decoded picture of the I0 picture is stored in the buffer fb3, and the control section 13 causes this data to be supplied to the display section 17 and displayed.

The control section 13 also performs decoding of the P4 picture in this frame period. Prior to this decoding, in step S61 the control section 13 exchanges the data of fb0 and fb1, and in step S65 the control section 13 exchanges the contents of fb1 and fb2. The decoded picture of the P4 picture is written in the buffer fb1 in step S66.

When the STC reaches 18000, the P5 and P6 pictures can be decoded. In step S46, the control section 13 exchanges the contents of the buffers fb0 and fb1, and thereafter, in step S48, exchanges the contents of the buffers fb1 and fb3. Further, in step S51, the control section 13 exchanges the contents of the buffers fb3 and fb2. Next, the control section 13 decodes the P5 picture. The P5 picture is written in the buffer fb1 (step S52).

At this time point, the decoded picture of the P2 picture is stored in the buffer fb3, and the control section 13 causes this data to be supplied to the display section 17 and displayed.

The control section 13 also performs decoding of the P6 picture in this frame period. Prior to this decoding, in step S61 the control section 13 exchanges the data of fb0 and fb1, and in step S65 the control section 13 exchanges the contents of fb1 and fb2. The decoded picture of the P6 picture is written in the buffer fb1 in step S66.

The operations are repeated in a similar manner thereafter. Thus, as shown in FIG. 12, all the pictures are decoded and the decoded picture is written in the buffer fb1 while exchanging the contents of the four buffers fb0 to fb3. As a result, decoded picture of frames at a uniform skipping interval that is in accordance with the speed multiplying number can be stored in the display buffer fb3, and the data can be output in display order and displayed at double speed.

FIG. 13 and FIG. 14 illustrate an example of encoded frames that includes B pictures. FIG. 13 shows the relationship between pictures I2, B0, B1, P5, B3, B4, P6 . . . P10 and the DTS of each picture of the encoded frames. More specifically, in the encoded frames shown in FIG. 13, B pictures occur in a mixed sequence in one part, and P pictures occur in succession in one part.

FIG. 14 illustrates memory management with respect to the example shown in FIG. 13. When an I2 picture is input, the control section 13 causes the decoder 14 to decode the I2 picture. The decoded picture of the I2 picture is written in the buffer fb1 in step S52 in FIG. 9.

When the STC reaches 6000, as shown in FIG. 13, the B0 and B1 pictures can be decoded. As shown in FIG. 7, with respect to I and B pictures, the control section 13 decodes the picture that is input last, i.e. the B1 picture, with priority. In step S43, the control section 13 exchanges the contents of the buffers fb2 and fb3, and thereafter decodes the B1 picture. The control section 13 writes the B1 picture in the buffer fb1.

When the STC reaches 12000, the P5 and B3 pictures can be decoded. As shown in FIG. 7, with respect to I, P and B pictures, the control section 13 selects pictures according to the order of priority of I>P>B. More specifically, the control section 13 decodes the P5 picture with priority over the B3 picture. Prior to decoding the P5 picture, in step S46, the control section 13 exchanges the contents of the buffers fb0 and fb1, and thereafter, in step S48, exchanges the contents of the buffers fb1 and fb3. Further, in step S51, the control section 13 exchanges the contents of the buffers fb3 and fb2. Next, the control section 13 decodes the P5 picture. The P5 picture is written in the buffer fb1 (step S52).

At this time point, the decoded picture of the B1 picture is stored in the buffer fb3, and the control section 13 causes this data to be supplied to the display section 17 and displayed.

When the STC reaches 18000, the B4 and P6 pictures can be decoded. In this case also, the control section 13 decodes the P6 picture with priority over the B4 picture. Prior to decoding the P6 picture, in step S46, the control section 13 exchanges the contents of the buffers fb0 and fb1, and thereafter, in step S48, exchanges the contents of the buffers fb1 and fb3. Next, the control section 13 decodes the P6 picture. The P6 picture is written in the buffer fb1 (step S52).

At this time point, the decoded picture of the I2 picture is stored in the buffer fb3, and the control section 13 causes this data to be supplied to the display section 17 and displayed.

When the STC reaches 24000, the P7 and P8 pictures can be decoded. In step S46, the control section 13 exchanges the contents of the buffers fb0 and fb1, and thereafter, in step S48, exchanges the contents of the buffers fb1 and fb3. Next, the control section 13 decodes the P7 picture. The P7 picture is written in the buffer fb1 (step S52).

At this time point, the decoded picture of the P5 picture is stored in the buffer fb3, and the control section 13 causes this data to be supplied to the display section 17 and displayed.

According to the present embodiment, the control section 13 also performs decoding of the P8 picture in this frame period. Prior to this decoding, in step S61 the control section 13 exchanges the data of fb0 and fb1, and in step S65 the control section 13 exchanges the contents of fb1 and fb2. Subsequently, the control section 13 decodes the P8 picture and writes the decoded picture in the buffer fb1 in step S66.

When the STC reaches 30000, the P9 and P10 pictures can be decoded. In step S46, the control section 13 exchanges the contents of the buffers fb0 and fb1, and thereafter, in step S48, exchanges the contents of the buffers fb1 and fb3. Further, in step S51, the control section 13 exchanges the contents of the buffers fb3 and fb2. Next, the control section 13 decodes the P9 picture. The P9 picture is written in the buffer fb1 (step S52).

At this time point, the decoded picture of the P6 picture is stored in the buffer fb3, and the control section 13 causes this data to be supplied to the display section 17 and displayed.

The control section 13 also performs decoding of the P10 picture in this frame period. Prior to this decoding, in step S61 the control section 13 exchanges the data of fb0 and fb1, and in step S65 the control section 13 exchanges the contents of fb1 and fb2. Subsequently, the control section 13 decodes the P10 picture and writes the decoded picture in the buffer fb1 in step S66.

The operations are repeated in a similar manner thereafter. Thus, as shown in FIG. 14, for pictures at a skipping interval that is, on average, in accordance with the speed multiplying number, decoded picture can be written in the buffer fb1 while exchanging the contents of the four buffers fb0 to fb3. As a result, decoded picture of frames at a skipping interval that is approximately in accordance with the speed multiplying number can be stored in the display buffer fb3, and the data can be output in display order and displayed at double speed.

According to the present embodiment configured as described above, pictures are selected in accordance with a speed multiplying number at a time of multiple speed reproduction, and a number of pictures that are in accordance with the speed multiplying number are decoded in one frame period. By storing decoded picture while exchanging the contents of buffers for data of four frames of the memory section, it is possible to store decoded picture of pictures that are in accordance with the speed multiplying number in the display buffer in correspondence with the display timing. As a result, multiple speed reproduction in which a skipping interval is approximately uniform is enabled, and it is possible to prevent multiple speed reproduction images from having a jerky motion.

In this connection, according to the examples shown in FIG. 9 to FIG. 14, a configuration is adopted in which decoded picture used for display is always stored in the display buffer. Naturally, when adopting a configuration in which data used for display is directly supplied to the display section from another buffer or the like, a management method other than the memory management illustrated in FIG. 9 to FIG. 14 can be adopted.

While certain embodiments have been described, these embodiments have been presented by way of example only, ad are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims aid their equivalents are intended to cover such forms or modifications as would fall within the scope and spirit of the inventions.

What is claimed is:

1. An image decoding apparatus, comprising:
    a decoding section configured to decode pictures of an encoded stream and output decoded pictures; and
    a control section configured to control the decoding section, and to perform memory management of a memory that has memory areas for storing four pictures including two reference pictures, the decoded picture from the decoding section, and the decoded picture for display, wherein the control section controls the decoding section to decode at least first and second pictures in one frame period at a time of multiple speed reproduction, and reallocates pictures stored in the memory areas, wherein:
    when pictures that are decoded are an I and a P picture, the control section stores decoded picture of the pictures in a first or a second storage area that is a memory area that stores a reference image;
    when a picture that is decoded is a B picture, the control section stores decoded picture of the picture in a third storage area that is a memory area that stores decoded picture;
    when storing decoded picture of an I and a P picture in the third storage area in a case where pictures that are decoding objects are an I and a P picture, if decoded picture to be displayed in a current frame period is stored in a fourth storage area that is a memory area that stores the decoded picture that is used for display, after exchanging data of the first or second storage area with data of the third storage area, the control section stores the decoded picture of the I and P pictures in the third storage area; and
    when decoded picture to be displayed in the current frame period is not stored in the fourth storage area, after exchanging data of the first or second storage area with data of the fourth storage area, the control section determines whether or not decoded picture to be displayed in the current frame period is stored in the fourth storage area, and if the decoded picture is not stored in the fourth storage area, the control section exchanges data of the fourth storage area with data of the third storage area and thereafter stores the decoded picture of the I and P pictures in the third storage area, and if the decoded picture is stored in the fourth storage area, the control section stores the decoded picture of the I and P pictures in the third storage area without exchanging data.

2. The image decoding apparatus according to claim 1, wherein the control section selects a P picture as a second picture at a time of multiple speed reproduction.

3. The image decoding apparatus according to claim 1, wherein, when a plurality of pictures are determined decodable based on decoding time information, the control section controls the decoding section to decode the plurality of pictures in an order of priority of an I picture, a P picture, and a B picture.

4. The image decoding apparatus according to claim 1, wherein, the control section does not perform decoding of the second picture in a case where the first picture is B picture.

5. The image decoding apparatus according to claim 3, wherein the control section selects a P picture as a second picture to be decoded at a time of multiple speed reproduction.

6. The image decoding apparatus according to claim 1, wherein:
    when decoded picture is an I or a P picture, the control section stores decoded picture in a first or a second memory area that is for storing a reference image;
    when a decoded picture is a B picture, the control section stores decoded picture of the picture in a third memory area that is for storing decoded picture; and
    in a case where storing decoded B picture in the third memory area when decoded picture to be displayed in a current frame period is stored in a fourth memory area; the forth memory area is for storing picture for display, the decoded B picture is stored in the third storage area after reallocating pictures in the third memory area with the fourth memory area.

7. The image decoding apparatus according to claim 1, wherein:
    in a case where the memory section includes a first storage area and a second storage area that store the reference images of the two frames that comprise a forward reference image and a backward reference image, and a third storage area and a fourth storage area that store the decoded picture and the decoded picture that is used for display, when decoding a picture that is a second picture to be decoded at a time of multiple speed reproduction, the control section:

exchanges data stored in the first storage area with data stored in the second storage area, and determines whether or not the data stored in the second storage area is to be displayed in a current frame or a next frame period, and if the data is not to be displayed, writes decoded picture in the second storage area, and if the data is to be displayed, further determines whether or not data of the third storage area is to be displayed in the current frame or the next frame period, and if the data is to be displayed, after exchanging data stored in the second storage area with data stored in the fourth storage area, writes decoded picture in the second storage area, and if the data is not to be displayed, after exchanging data stored in the second storage area with data stored in the third storage area, writes decoded picture in the second storage area.

8. The image decoding apparatus according to claim 2, wherein:

in a case where the memory section includes a first storage area and a second storage area that store the reference images of the two frames that comprise a forward reference image and a backward reference image, and a third storage area and a fourth storage area that store the decoded picture and the decoded picture that is used for display, when decoding a picture that is a second picture to be decoded at a time of multiple speed reproduction, the control section:

exchanges data stored in the first storage area with data stored in the second storage area, and determines whether or not the data stored in the second storage area is to be displayed in a current frame or a next frame period, and if the data is not to be displayed, writes decoded picture in the second storage area, and if the data is to be displayed, further determines whether or not data of the third storage area is to be displayed in the current frame or the next frame period, and if the data is to be displayed, after exchanging data stored in the second storage area with data stored in the fourth storage area, writes decoded picture in the second storage area, and if the data is not to be displayed, after exchanging data stored in the second storage area with data stored in the third storage area, writes decoded picture in the second storage area.

9. The image decoding apparatus according to claim 6, wherein:

in a case where the memory section includes a first storage area and a second storage area that store the reference images of the two frames that comprise a forward reference image and a backward reference image, and a third storage area and a fourth storage area that store the decoded picture and the decoded picture that is used for display, when decoding a picture that is a second picture to be decoded at a time of multiple speed reproduction, the control section:

exchanges data stored in the first storage area with data stored in the second storage area, and determines whether or not the data stored in the second storage area is to be displayed in a current frame or a next frame period, and if the data is not to be displayed, writes decoded picture in the second storage area, and if the data is to be displayed, further determines whether or not data of the third storage area is to be displayed in the current frame or the next frame period, and if the data is to be displayed, after exchanging data stored in the second storage area with data stored in the fourth storage area, writes decoded picture in the second storage area, and if the data is not to be displayed, after exchanging data stored in the second storage area with data stored in the third storage area, writes decoded picture in the second storage area.

10. The image decoding apparatus according to claim 1, wherein:

in a case where the memory section includes a first storage area and a second storage area that store the reference images of the two frames that comprise a forward reference image and a backward reference image, and a third storage area and a fourth storage area that store the decoded picture and the decoded picture that is used for display, when decoding a picture that is a second picture to be decoded at a time of multiple speed reproduction, the control section:

exchanges data stored in the first storage area with data stored in the second storage area, and determines whether or not the data stored in the second storage area is to be displayed in a current frame or a next frame period, and if the data is not to be displayed, writes decoded picture in the second storage area, and if the data is to be displayed, further determines whether or not data of the third storage area is to be displayed in the current frame or the next frame period, and if the data is to be displayed, after exchanging data stored in the second storage area with data stored in the fourth storage area, writes decoded picture in the second storage area, and if the data is not to be displayed, after exchanging data stored in the second storage area with data stored in the third storage area, writes decoded picture in the second storage area.

11. The image decoding apparatus according to claim 1, wherein:

in a case where the memory section includes a first storage area and a second storage area that store the reference images of the two frames that comprise a forward reference image and a backward reference image, and a third storage area and a fourth storage area that store the decoded picture and the decoded picture that is used for display, the control section:

when pictures that are decoded are an I and a P picture, stores decoded picture of the pictures in a first or a second storage area that is a memory area that stores a reference image, when a picture that is decoded is a B picture, stores decoded picture of the picture in a third storage area that is a memory area that stores decoded picture, and when storing decoded picture of a B picture in the third storage area in a case where a picture that is a decoding object is a B picture, if decoded picture to be displayed in a current frame period is stored in a fourth storage area that is a memory area that stores the decoded picture that is used for display, after exchanging data of the third storage area with data of the fourth storage area, stores the decoded picture of the B picture in the third storage area; and when decoding a picture that is a second picture to be decoded at a time of multiple speed reproduction, the control section:

exchanges data stored in the first storage area with data stored in the second storage area, and determines whether or not the data stored in the second storage area is to be displayed in a current frame or a next frame period, and if the data is not to be displayed, writes decoded picture in the second storage area, and if the data is to be displayed, further determines whether or not data of the third storage area is to be displayed in the current frame or the next frame period, and if the data is to be displayed, after exchanging data stored in the second storage area with data stored in the fourth storage area, writes decoded picture in the second storage area, and if the data is not to be displayed, after exchanging data stored in the second storage area with data stored in the third storage area, writes decoded picture in the second storage area.

12. The image decoding apparatus according to claim 1, wherein:

in a case where the memory section includes a first storage area and a second storage area that store the reference images of the two frames that comprise a forward reference image and a backward reference image, and a third storage area and a fourth storage area that store the decoded picture and the decoded picture that is used for display, the control section:

when storing decoded picture of an I and a P picture in the third storage area in a case where pictures that are decoding objects are an I and a P picture, if decoded picture to be displayed in a current frame period is stored in a fourth storage area that is a memory area that stores the decoded picture that is used for display, after exchanging data of the first or second storage area with data of the third storage area, stores the decoded picture of the I and P pictures in the third storage area, and when decoded picture to be displayed in the current frame period is not stored in the fourth storage area, after exchanging data of the first or second storage area with data of the fourth storage area, the control section determines whether or not decoded picture to be displayed in the current frame period is stored in the fourth storage area, and if the decoded picture is not stored in the fourth storage area, the control section exchanges data of the fourth storage area with data of the third storage area and thereafter stores the decoded picture of the I and P pictures in the third storage area, and if the decoded picture is stored in the fourth storage area, the control section stores the decoded picture of the I and P pictures in the third storage area without exchanging data; and when decoding a picture that is a second picture to be decoded at a time of multiple speed reproduction, the control section:

exchanges data stored in the first storage area with data stored in the second storage area, and determines whether or not the data stored in the second storage area is to be displayed in a current frame or a next frame period, and if the data is not to be displayed, writes decoded picture in the second storage area, and if the data is to be displayed, further determines whether or not data of the third storage area is to be displayed in the current frame or the next frame period, and if the data is to be displayed, after exchanging data stored in the second storage area with data stored in the fourth storage area, writes decoded picture in the second storage area, and if the data is not to be displayed, after exchanging data stored in the second storage area with data stored in the third storage area, writes decoded picture in the second storage area.

13. A non-transitory computer readable medium configured to store a program comprising instructions for:

analyzing a picture type of each picture of an inputted encoded stream that is predictively encoded;

selecting a picture to decode based on a speed multiplying number and the picture type at a time of multiple speed reproduction;

decoding a picture that is selected;

controlling a memory section that has memory areas for data of four frames that stores the reference images of two frames, the decoded picture that is obtained by decoding, and the decoded picture that is used for display, and exchanging data that is stored among the memory areas for data of four frames so that the decoded picture that is used for the display at a time of multiple speed reproduction is held in the memory area; and storing the decoded picture in the memory section, wherein:

exchanging data that is stored among the memory areas for data of four frames, and storing the decoded picture in the memory section comprises:

in a case where the memory section includes a first storage area and a second storage area that store the reference images of the two frames that comprise a forward reference image and a backward reference image, and a third storage area and a fourth storage area that store the decoded picture and the decoded picture that is used for display, when decoding a picture that is a second picture to be decoded at a time of multiple speed reproduction, exchanging data stored in the first storage area with data stored in the second storage area, determining whether or not data stored in the second storage area is to be displayed in a current frame or a next frame period, when the data is not to be displayed, writing decoded picture in the second storage area, when the data is to be displayed, further determining whether or not data of the third storage area is to be displayed in the current frame or the next frame period, when the data is to be displayed, exchanging data stored in the second storage area with data stored in the fourth storage area, and thereafter writing decoded picture in the second storage area, and when the data is not to be displayed, exchanging data stored in the second storage area with data stored in the third storage area, and thereafter writing decoded picture in the second storage area.

* * * * *